A. V. POWELL.
NUT LOCK.
APPLICATION FILED JULY 2, 1918.
1,307,924.
Patented June 24, 1919.
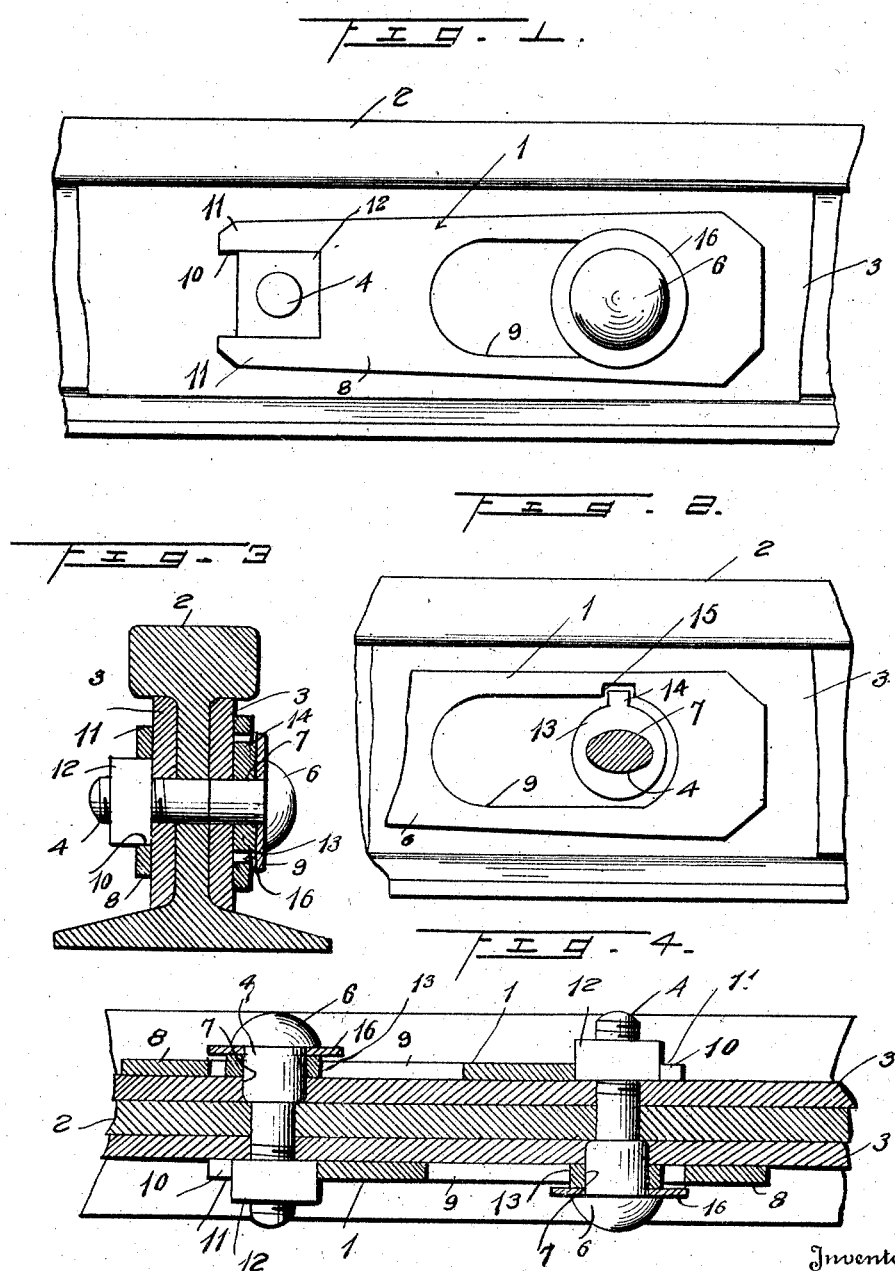
Inventor
A. V. Powell.

UNITED STATES PATENT OFFICE.

ALONZO V. POWELL, OF BOWLING GREEN, OHIO.

NUT-LOCK.

1,307,924.

Specification of Letters Patent.

Patented June 24, 1919.

Application filed July 2, 1918. Serial No. 243,070.

*To all whom it may concern:*

Be it known that I, ALONZO V. POWELL, a citizen of the United States, residing at Bowling Green, in the county of Wood and State of Ohio, have invented certain new and useful Improvements in Nut-Locks; and I do hereby declare the following to be a full, clear, and exact description of the invention, such as will enable others skilled in the art to which it appertains to make and use the same.

This invention relates to nut locks, and the primary object of the invention is to provide an improved nut lock especially adapted for use on joints of railroad rails so as to prevent the displacement and loosening of the nuts off of the bolts uniting the ends of the rails and thereby eliminate the usual accidents associated with the parting of the rail ends.

Another object of the invention is the provision of an improved nut lock for rail joints including a flat plate arranged to engage one bolt and to extend parallel with the fish plate and engage the nut of the opposite bolt to prevent movement thereof, the plate being adjustable on the first bolt, and said bolt having means to hold the plate against movement after final adjustment.

A still further object of the invention is to provide an improved nut lock of the above character, which is durable and efficient in use, one that is simple and easy to manufacture, and one that can be placed upon the market at a reasonable cost.

With these and other objects in view the invention consists in the novel construction, arrangement and formation of parts, as will be hereinafter more specifically described, claimed and illustrated in the accompanying drawing, forming a part thereof, in which:—

Figure 1 is a front elevation of the improved nut lock showing the same in operative position on a rail joint, Fig. 2 is a fragmentary front elevation of the nut lock applied to a rail joint showing the bolt in section, Fig. 3 is a transverse section taken through the rail joint showing the nut lock applied thereto, and Fig. 4 is a horizontal longitudinal section through the rail joint showing the nut lock applied thereto.

Referring to the drawing in detail wherein similar reference numerals designate corresponding parts, throughout the several views, the numeral 1 generally indicates the improved nut lock, which is adapted to be used in connection with the ordinary rail joint including the rail ends 2 having the usual fish plates 3 held in position by the ordinary bolts 4. The bolts 4 are so arranged that the heads of the same are arranged alternately, that is, the head of one bolt will be on one side of the rail, while the head of the next bolt will be on the opposite side of the rail. The bolts 4 are shown of the ordinary construction and have the shanks 5 of the same provided adjacent the heads with an elliptical portion 7 which is adapted to engage in elliptical apertures formed in the fish plates 3 for preventing rotation of the bolts in relation to the same.

The improved nut lock 1 includes a substantially flat plate 8 which is provided intermediate its ends with the slot 9 that is adapted to fit over the elliptical portion 7 of the bolts 4. The slot 9 is formed relatively wider than the elliptical portion of the bolts 4 so that the plate can be readily slid on the same, for a purpose which will hereinafter more fully appear. One end of the plate has its forward end bifurcated or provided with an inwardly extending slot 10, that provides a pair of spaced arms 11 that are adapted to engage on each side of a nut 12, that is adapted to be turned on the end of the bolts 4. While the nuts 12 are shown square any suitable nut may be used, such as hexagonal or octagonal. A washer 13 is provided having an elliptical aperture which is adapted to snugly fit the elliptical portion 7 of the bolt 4 so that the washer cannot turn on the same and the washer is formed with a diameter less than the width of the slot 9, so that the same can be readily fitted in the slot 9 when placed on the washer. The washer 13 is formed relatively thicker than the plate 8, so that the plate can readily slide on the same during adjustment. The washer 13 has an upwardly extending tongue 14 projecting radially therefrom, which is adapted to engage in a recess 15 formed in the upper side wall of the slot 9. A relatively large thin washer 16 having a diameter greater than the width of the plate 8 is positioned between the bolt head 6 and the plate 8 and prevents the plate from riding off of and over the bolt heads.

In operation of the improved device, the large thin washers 16 are placed on the bolts adjacent to the heads thereof and the small thick washers 13 are then placed on the bolts next to the washers 16 and the slide plates 8 are then positioned on the bolts over the washers 13 and the bolts are then placed alternately through the rail and fish plates as described above. The nuts are then turned to the required position and the plate 8 is then slid on the bolt, so as to position the spaced arms 11 on each side of the nuts 12 to prevent movement thereof and the plates are then dropped downwardly so as to position the radially extending tongue 14 in the recess 15, which prevents accidental movement of the plates.

When it is desired to remove the nuts, the plates 8 are forced upwardly so that the recesses 15 will be positioned above the tongue and the plate is then forced rearwardly so as to position the arms 11 in rear of the nut 12 and then the same can be readily turned in the ordinary manner.

From the foregoing description it can be seen that an improved nut lock is provided which is especially adapted for rail joints that is so formed that the same can be readily applied to any rail joints and hold the nuts against movement.

While the bolts, nuts and fish plates are all standard sizes however on some of the extra heavy rails the holes are wider apart, in that case it would be only necessary to make the plate the required length.

In practice, I have found that the form of my invention, illustrated in the accompanying drawing and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim as new is:—

1. In a nut lock of the class described, the combination with a rail joint, bolts extending therethrough, the heads of the bolts being arranged alternately, nuts fitted on the bolts, of a plate mounted on the shank of one bolt for movement longitudinally of the rail joint and arranged to engage the nut of the adjacent bolt to prevent rotation thereof.

2. In a nut lock of the class described, the combination with a rail joint, bolts extending therethrough, the heads of the bolts being arranged alternately in relation to each other, nuts fitted on the bolts, of a plate mounted on the shank of one bolt for movement longitudinally and transversely of the rail joint and arranged to engage the nut of the adjacent bolt to prevent rotation thereof, and means to lock the plate on the first mentioned bolt to prevent movement thereof.

3. In a device of the class described, the combination with a rail joint, bolts extending therethrough, the heads of the bolts being arranged alternately in relation to each other, nuts fitted on the bolts, of a plate slidably mounted on the shank of one bolt, one end of the plate being bifurcated to form a pair of spaced arms, the arms being adapted to engage the nut of a bolt adjacent to the first mentioned bolt to prevent rotation thereof, and means to prevent movement of the plate on the first mentioned bolt.

4. In a device of the class described, the combination with a rail joint, bolts extending through the joint, the heads of the bolts being arranged alternately in relation to each other, the shanks of the bolts adjacent to the heads thereof being formed elliptical in cross section, a relatively thick washer on the bolts, nuts turned on the ends of the bolts, a plate having a slot therein of greater width than the washer on the bolts and heads so that the same can readily slide on the washer, one end of the plate being provided with a pair of spaced arms to engage the nut of the bolt adjacent to the first mentioned bolt, a radially extending tongue on the washer, an inwardly extending recess formed in the upper wall of the slot adapted to receive the tongue to prevent movement of the plate of the first mentioned bolt, as and for the purpose specified.

In testimony whereof I affix my signature in presence of two witnesses.

ALONZO V. POWELL.

Witnesses:
J. A. POWELL,
G. A. POWELL.

Copies of this patent may be obtained for five cents each, by addressing the "Commissioner of Patents, Washington, D. C."